United States Patent Office 2,907,755
Patented Oct. 6, 1959

2,907,755
POLYMERIZATION OF LACTAMS IN PRESENCE OF CARBON MONOXIDE

Hans Lautenschlager, Ludwigshafen (Rhine), Herbert Friederich, Worms (Rhine), Wolfgang Schmidt, Neustadt, Weinstrasse, and Karl Dachs, Ludwigshafen (Rhine), Germany, assignors to Badische Anilin- & Soda-Fabrik Aktiengesellschaft, Ludwigshafen (Rhine), Germany No Drawing. Application November 5, 1957
Serial No. 694,490

Claims priority, application Germany November 7, 1956

17 Claims. (Cl. 260—78)

This invention relates to the catalyzed polymerisation of lactams having 5 to 10 ring members.

It is already known that pyrrolidone can be polymerised in the presence of an alkaline polymerisation catalyst, for example of about 0.4 to 30% of an alkali or alkaline earth metal or anhydrous alkali or alkaline earth metal compounds, at temperatures between about 70° and 180° C. This polymerisation can also be carried out at room temperature, but long polymerisation periods, which may amount to several weeks, are then necessary. It has therefore already been proposed to add in the polymerisation of pyrrolidone, in addition to the alkali or alkaline earth metal or their alkaline-reacting compounds, also compounds containing acyl groups as co-catalysts. In this way, however, it is impossible to polymerise pyrrolidone completely. In general only 30 to 60% of the monomeric pyrrolidone is converted, in rare cases up to 75%.

Furthermore it is also known that lactams with six and more ring members can be converted by heating with small amounts of water or compounds which split off water, if necessary under pressure, into polyamides. Their polymerisation has also been proposed with the aid of alkaline catalysts at elevated temperature. Both methods are carried out at temperatures at or above 200° C. There is therefore the risk, especially with more sensitive lactams, of the occurrence of decomposition reactions which lead to discolouration of the polymers. Moreover the polymerisation proceeds in the presence of water only to a state of equilibrium in which a more or less large amount of monomer residue is present. Finally it is very difficult, if not impossible, to obtain large shaped articles by polymerisation at high temperatures because even with careful cooling, cracks readily occur in the articles.

We have now found that lactams with five to ten ring members can be polymerised with especially great speed and with good yields in an anhydrous medium with the aid of alkaline-reacting polymerisation catalysts, especially alkali metals or anhydrous alkali metal compounds which react alkaline in aqueous medium, by using carbon monoxide as co-catalyst. The lactams which can be polymerised in this way have the general formula

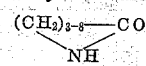

The following are examples of compounds belonging to this class: alpha-pyrrolidone, alpha-piperidone, epsilon-caprolactam, omega-oenanthic lactam, omega-caprylic lactam. Lactams which are substituted on one or more of the methylene groups, for example by alkyl radicals, preferably lower alkyl radicals, for example having up to 8 carbon atoms, can also be used, for example alpha-ethylpyrrolidone or alpha,beta-dimethylpyrrolidone. Mixtures of these lactams can also be polymerised in this way, for example mixtures of caprolactam and caprylic lactam or oenanthic lactam and caprolactam. Copolymers are thereby obtained.

The polymerisation is advantageously carried out at temperatures between about 10° and 250° C., the polymerisation of pyrrolidone preferably at 20° to 125° C., and that of the higher lactams at about 100° to 150° C. The polymerisation can be at temperatures below 10° C., however, when a solvent for the lactam is used. In general the polymerisation may be under normal pressure. In many cases it is suitable however to use increased pressure, for example pressures up to 1000 or more atmospheres, and preferably between about 20 and 200 atmospheres. The speed of polymerisation can often be increased in this way and a practically complete conversion to high molecular weight products achieved.

The carbon monoxide used should be as free as possible from water. Small amounts of oxygen, for example up to 5%, are not injurious. It can also contain small amounts of gases which do not disturb the polymerisation reaction of the lactams, for example nitrogen, hydrogen or hydrocarbons. Carbon monoxide can often be led into the reaction mixture. It is also possible, however, to heat the lactam to be polymerised in an atmosphere of carbon monoxide, if desired while stirring or shaking. In general about 0.001 to 0.1 part of carbon monoxide, with reference to the lactam to be polymerised, is used. Small amounts down to traces are often sufficient. It is however essential to avoid the carbon monoxide being expelled by other gases. Larger amounts of carbon monoxide are in general not injurious.

Even small amounts of alkali or also alkaline earth metals or their anhydrous alkaline-reacting compounds are sufficient to obtain the desired end products. All the alkali metals may be used, for example lithium, sodium, potassium, rubidium, caesium, and also the alkaline earth metals, such as magnesium, calcium, strontium and barium. To the alkaline-reacting compounds of these metals there belong for example their oxides, hydroxides, carbonates, bicarbonates or amides, as for example sodium hydroxide, potassium hydroxide, sodium bicarbonate, potassium carbonate, lithium oxide. The compounds of these metals with lactams and also organometallic compounds may also be used, for example the sodium or potassium salts of pyrrolidone or caprolactam, or amyl sodium, butyl lithium, cyclohexyl sodium or phenyl lithium, or in general compounds of the alkali metals with aliphatic, cycloaliphatic or aromatic hydrocarbons, preferably with 1 to 6 carbon atoms in the molecule.

By polymerising without the use of pressure at relatively low temperatures, for example at 30° to 90° C., colourless polyamide powders can be obtained which precipitate from the monomer melt. These powders can be separated from the hot melt by known physical separation methods, for example by filtration or centrifuging, in some cases continuously. When working at higher temperatures, for example between 90° and 150° C., the polymerisation, in the case of lactams with more than six ring members, proceeds very rapidly after a certain induction period, so that within a short period the monomer melt, usually with an increase in temperature, solidifies to a block of polymer. Depending on the method of operation and the lactam used, this block of polymer still contains 0.5 to 20% of monomer. In the polymerisation of pyrrolidone at temperatures between 100° and 150° C., the reaction mixture remains liquid even when carbon monoxide is led in for hours. It is only upon cooling under a carbon monoxide atmosphere that the polymerisation sets in. It is ended within half to two hours and yields a solid polymer which still contains 10 to 30% of monomer. By working with carbon monoxide under pressure, however, the induction period for the polymerisation can be shortened, the reaction temperature lowered, the yield of polymer increased and the amount of carbon monoxide used diminished. There are then usually formed block polymers when working without diluents even at low temperatures. The product may be allowed to cool under normal or increased pressure. It is preferable however to remove the resultant polymer from the pressure vessel in the liquid state and to allow it to solidify in a separate vessel.

On the other hand it is possible to effect the polymerisation in the presence of anhydrous organic liquids which do not dissolve the lactams and which do not possess any hydrogen atoms which will react with the compounds used. Hydrocarbons are especially suitable, for example cycloaliphatic, if desired partly unsaturated, hydrocarbons, such as cyclohexane, dimethylcyclohexane, decahydronaphthalene, tetrahydronaphthalene, and also aliphatic hydrocarbons, as for example pentane, heptane, petroleum ether, or aromatic hydrocarbons, such as benzene, toluene, ethylbenzene, xylene or halogen hydrocarbons, such as tetrachlorethane, hexachlorethane, chlorbenzenes and dichlorbenzenes. The anhydrous lactams containing alkali can be dispersed in the anhydrous liquids while leading in carbon monoxide. In this way pulverulent or very light porous products are obtained. The polymerisation reaction may be carried out continuously or discontinuously.

The polymers obtained are especially pure, solid, hard, colourless products which are eminently suitable for use for the production of fibres and threads, and also for all purposes for which polylactams are used in the normal way, i.e. for the production of wires, injection mouldings or other shaped articles, foils, thin coatings on metal articles and the like. Since the polymerisation reaction can be carried out at considerably lower temperatures, the lactams polymerise extensively so that the polymerisation products obtained contain smaller amounts of monomers or low-molecular compounds. A further advantage of the proposed process is that the chain length of the polymers obtained can be influenced by varying the carbon monoxide pressure. By an increase in the carbon monoxide pressure in the range of 0 to 100 atmospheres, the molecular weight of the polymer is increased in the case of caprolactam, and decreased in the case of pyrrolidone. Furthermore it is an advantage that even very small amounts of carbon monoxide are sufficient to initiate the polymerisation. By reason of the slowness in reaction of carbon monoxide there is also no risk of the formation of any impurities adhering to the polymers. The polymerisation products obtained are high molecular to the extent of about 70 to 100% depending on the lactam used and on the pressures and temperatures used. If necessary unreacted monomeric constituents can be removed in the usual technical manner by extraction with water, methanol or other solvents.

The following examples will further illustrate this invention but the invention is not restricted to these examples. The part specified in the examples are parts by weight.

*Example 1*

From 700 parts of epsilon-caprolactam, after the addition of 10 parts of potassium hydroxide, 70 parts are distilled off in vacuo. Into the resulting clear melt, carbon monoxide is led in while stirring at 125° C. After a short time the mixture becomes cloudy. After 45 minutes, a thick paste has formed which after an hour can no longer be stirred. It is kept at 125° C. for another hour and then allowed to cool. The solid product obtained melts at 210° C. and has the K-value 53. The content of monomers amounts to 29%.

*Example 2*

By polymerising as described in Example 1 but at 150° C. instead of 125° C., the reaction mixture suddenly solidifies after 40 minutes. After cooling, a colourless, very hard polyamide of the melting point 212° C., K-value 69 and monomers content 18% is obtained.

*Example 3*

After adding 5 parts of potassium hydroxide to 350 parts of omega caprylic lactam, 35 parts are distilled off at a pressure of 0.2 mm. Hg. Carbon monoxide is then led into the residual clear melt while stirring at 100° C. The mixture rapidly becomes cloudy. After 20 minutes a white precipitate has formed. After 32 minutes the mixture suddenly solidifies. After cooling, a colourless polymer is obtained which has the melting point 192° C., K-value 109 and monomers content of 1.2%.

By using nitrogen instead of carbon monoxide, the melt is unchanged even after 3 hours. After cooling, a sample is soluble in methanol without residue.

*Example 4*

After adding 7 parts of sodium hydroxide to 700 parts of epsilon-caprolactam, 70 parts are distilled off in vacuo. The melt is introduced into a steel pressure vessel which is rotated about its longitudinal axis. The air is then expelled with carbon monoxide, the carbon monoxide pressure increased to 50 atmospheres, heated to 125° C. and the carbon monoxide pressure finally raised to 100 atmospheres. After 6 hours it is allowed to cool and the pressure reduced to atmospheric pressure. A yellowish, solid polymer is obtained which melts at 213° C. and has the K-value 74.

100 parts of the polymer are powdered and extracted with methanol for 3 hours. After drying in vacuo, 96 parts of a colourless powder remain which melts at 219° C. The K-value amounts to 82.

*Example 5*

After adding 5 parts of potassium hydroxide to 350 parts of omega-caprylic lactam, 35 parts of the latter are distilled off in vacuo. The clear melt is introduced with 600 parts of dimethyl cyclohexane in a pressure vessel provided with a stirrer. The air is expelled with carbon monoxide, the carbon monoxide pressure raised with powerful stirring to 100 atmospheres, the vessel heated to 100° C. and the pressure increased to 200 atmospheres. By filtration there is obtained a solid granular product. 100 parts thereof are extracted for 7 hours with methanol. 98 parts of a colourless powder are obtained which melts at 198° C. The K-value amounts to 65.

*Example 6*

0.5 part of sodium is dissolved in 55 parts of omega-oenanthic lactam. Then 5 parts of oenanthic lactam are distilled off in vacuo. 50 parts of dimethylcyclohexane are added to the residue. Then carbon monoxide is led in at 120° C. for 5 hours while stirring powerfully. Upon cooling there are obtained 42 parts of a colourless powder. After extraction with methanol for 3 hours, there remain 26 parts of a colourless powder which after drying in vacuo melts at 208° C. The K-value amounts to 48.

*Example 7*

5 parts of potassium hydroxide are added to 170 parts of epsilon-caprolactam. Then 30 parts of caprolactam are distilled off in vacuo and the residue mixed with 140 parts of omega-caprylic lactam. Into this mixture carbon monoxide is led at 100° C. while stirring. The whole is heated to 100° C. for 45 minutes. 100 parts of the resultant hard polyamide are extracted for 3 hours with methanol. 72 parts of a colourless powder are obtained of which the melting point amounts to 182° C. The K-value is 82.

*Example 8*

7 parts of potassium hydroxide are added to 700 parts of pyrrolidone. Then 30 parts of pyrrolidone are distilled off at a pressure of 0.5 to 10 mm. Hg. The residual clear solution is introduced into a pressure vessel of stainless steel which rotates about its longitudinal axis. The air is expelled by carbon monoxide and the carbon monoxide pressure raised to 50 atmospheres. The pressure vessel is heated to 100° C. and the carbon monoxide pressure raised to 200 atmospheres. After 30 minutes it is allowed to cool. The reaction product is a solid pale yellow, very hard mass.

100 parts thereof are powdered and extracted continuously with water for 2 hours. It is dried in vacuo at 60° C. and 90 parts of a colourless powdery polymer are obtained which melts at 251° C. and has the K-value 58.

Example 9

By polymerising as described in Example 8 but at 40° C. and under 100 atmospheres pressure, a colourless, hard polymer is obtained. From 100 parts of the powdered product there are obtained, after extraction with water and drying, 59 parts of a colourless powder which melts at 258° C. and has the K-value 65.

Example 10

8 parts of sodium hydroxide are added to 600 parts of pyrrolidone. Then 60 parts of pyrrolidone are distilled off under a pressure of 0.5 mm. Hg and the remainder polymerised as described in Example 8 but under a pressure of 200 atmospheres and at 100° C. for 3 hours. From 100 parts of the solid polymer there are obtained, after purification, 95 parts of a colourless powder which melts at 255° C. and has the K-value 61.

Example 11

1400 parts of dimethylcyclohexane are added to 700 parts of the polymerisable mixture used according to Example 8 and treated in a pressure vessel while stirring intensively at 60° C. with carbon monoxide under 200 atmospheres pressure for 12 hours. 615 parts of a pale yellow powder are obtained which becomes colourless by extraction with matter. After drying in vacuo at 60° C., 595 parts of a colourless powder are obtained which melts at 261° C. and has a K-value of 62.

Example 12

7 parts of potassium hydroxide are added to 700 parts of pyrrolidone. Then 30 parts of pyrrolidone are distilled off at 0.5 to 10 mm. Hg. Into the remaining clear solution, carbon monoxide is led through a silica gel drying tower in a slow stream, while the solution is stirred powerfully at 100° C. The reaction mixture thereby slowly becomes pale yellow in colour. After 2 hours, the mixture is allowed to cool. After another 2 hours it is completely solidified.

The pale yellow, very hard polymer is powdered and extracted for 2 hours continuously with water. The product thereby becomes colourless. After drying in vacuo at 60° C., there are obtained from 100 parts 85 parts of a colourless polymer which melts at 257° C. and has the K-value 71.

When nitrogen is used instead of carbon monoxide, the pyrrolidone mixture introduced does not change. After cooling a sample of the mixture is soluble in water without residue.

Example 13

2 parts of sodium hydroxide are added to 230 parts of pyrrolidone. Then 30 parts of pyrrolidone are distilled off as described in Example 12. The further procedure of Example 12 is then followed and there is similarly obtained a hard, pale yellowish polymer. After pulverising the same, 100 parts thereof are extracted for 2 hours continuously with water. After drying in vacuo, 81 parts of a colourless polymer are obtained which melts at 255° C. and has the K-value 75.5.

Example 14

By polymerising as described in Example 12 but at 75° C. a colourless pulverulent precipitate separates out after 15 minutes. After cooling, the product solidifies to a solid friable mass. 100 parts thereof are powdered and extracted continuously for 2 hours with water. After drying in vacuo at 60° C., 45 parts of a colourless powder are obtained which melts at 247° C. and has the K-value 82.

Example 15

300 parts of chlorbenzene are added to 100 parts of a reaction mixture prepared according to Example 12 and the whole heated for 24 hours at 100° C. while leading in dry carbon monoxide and stirring powerfully. After cooling, filtration and washing with water, 60 parts of a colourless powder are obtained which melts at 249° C. and has the K-value 79.

Example 16

A slow stream of carbon monoxide is led into 200 parts of a reaction mixture prepared as in Example 1, at 90° C. while stirring. After 20 minutes, a colourless powder begins to separate. After 6 hours the mixture has become a thick paste. By filtration by suction on a suction filter heated with steam, the precipitated powder is separated, washed with water and dried in vacuo. 84 parts of a polycaprolactam powder having the melting point 214° C. and the K-value 45 are obtained.

What we claim is:

1. In the polymerisation of a lactam selected from the group consisting of lactams having the general formula

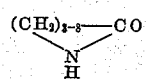

and C-alkyl derivatives thereof, catalyzed by an alkaline polymerisation catalyst, the improvement which comprises conducting the polymerisation while contacting said lactam with at least a catalytic amount of carbon monoxide.

2. A process as claimed in claim 1 wherein an alkali metal is used as the alkaline polymerisation catalyst.

3. A process as claimed in claim 1 wherein an anhydrous alkaline-reacting alkali metal compound is used as the alkaline polymerisation catalyst.

4. A process as claimed in claim 3 wherein the alkali metal compound used is an alkali metal oxide.

5. A process as claimed in claim 3 wherein the alkali metal compound used is an alkali metal hydroxide.

6. A process as claimed in claim 3 wherein the alkali metal compound used is an alkali carbonate.

7. A process as claimed in claim 3 wherein the alkali metal compound used is an alkali bicarbonate.

8. A process as claimed in claim 3, wherein the alkali metal compound used is the compound of an alkali metal with a hydrocarbon.

9. A process as claimed in claim 3 wherein the alkali metal compound used is the compound of an alkali metal with a lactam.

10. A process as claimed in claim 1 wherein the polymerisation is carried out as a bulk polymerisation.

11. A process as claimed in claim 1 wherein the polymerisation is carried out in a medium of an anhydrous organic liquid which does not dissolve the lactam and which has no hydrogen atoms capable of reacting with the reactants used.

12. A process as claimed in claim 1 wherein the polymerisation is carried out at a temperature between 10° and 250° C.

13. A process as claimed in claim 1 wherein the polymerisation is carried out at atmospheric pressure.

14. A process as claimed in claim 1 wherein the polymerisation is carried out at a pressure between 20 and 200 atmospheres.

15. A process as claimed in claim 1 wherein 0.001 to 0.1 part of carbon monoxide, with reference to the lactam to be polymerised, is used.

16. A process as claimed in claim 1 wherein the polymerisation is conducted in an anhydrous hydrocarbon medium.

17. A process as claimed in claim 1 wherein the polymerisation is conducted in an anhydrous halogenated hydrocarbon medium.

References Cited in the file of this patent

UNITED STATES PATENTS

| | | |
|---|---|---|
| 2,277,152 | Schlack | Mar. 24, 1942 |
| 2,809,958 | Barnes et al. | Oct. 15, 1957 |

UNITED STATES PATENT OFFICE

CERTIFICATE OF CORRECTION

Patent No. 2,907,755            October 6, 1959

Hans Lautenschlager et al.

It is hereby certified that error appears in the printed specification of the above numbered patent requiring correction and that the said Letters Patent should read as corrected below.

Column 5, line 40, for "matter" read -- water --.

Signed and sealed this 7th day of June 1960.

(SEAL)
Attest:

KARL H. AXLINE
Attesting Officer

ROBERT C. WATSON
Commissioner of Patents